United States Patent [19]

Vassmer

[11] Patent Number: 4,934,668
[45] Date of Patent: Jun. 19, 1990

[54] UNITARY SEAL FOR GAS PRESSURE SPRING ASSEMBLY

[75] Inventor: Gregory R. Vassmer, Garden Prairie, Ill.

[73] Assignee: Chicago Rawhide Manufacturing Co., Elgin, Ill.

[21] Appl. No.: 233,723

[22] Filed: Aug. 19, 1988

[51] Int. Cl.$^5$ ............................................. F16F 9/36
[52] U.S. Cl. ............................... 267/120; 188/322.17; 277/152
[58] Field of Search ................... 267/120; 188/322.16, 188/322.17; 277/152, 153, 181, 182, 183, 185, 186, 188 R, 188 A, 189

[56] References Cited

U.S. PATENT DOCUMENTS

| | | | |
|---|---|---|---|
| 2,994,571 | 8/1961 | Peras | 277/181 |
| 3,368,650 | 2/1968 | Wasdell | 188/322.17 |
| 4,053,166 | 10/1977 | Domkowski | 277/152 |
| 4,166,628 | 9/1979 | Blaydon | |
| 4,261,583 | 4/1981 | de Vries | 277/152 |

*Primary Examiner*—Andres Kashnikow
*Assistant Examiner*—Mark T. Le
*Attorney, Agent, or Firm*—James T. FitzGibbon; Angelo J. Bufalino

[57] ABSTRACT

A multi-purpose seal assembly for a gas-pressurized spring including a rigid positioning unit and an elastomeric body portion covering part of the positioning unit. The positioning unit is of generally annular form with a cylindrical outer diameter alignment surface and an inner diameter cylindrical guide surface. The elastomeric body portion includes spaced apart bevelled surfaces tapering toward each other to define an annular, radially outwardly acting static seal lip, and at least one pair of bevelled surfaces tapering towards each other to define a radially inwardly acting primary sealing lip.

10 Claims, 1 Drawing Sheet

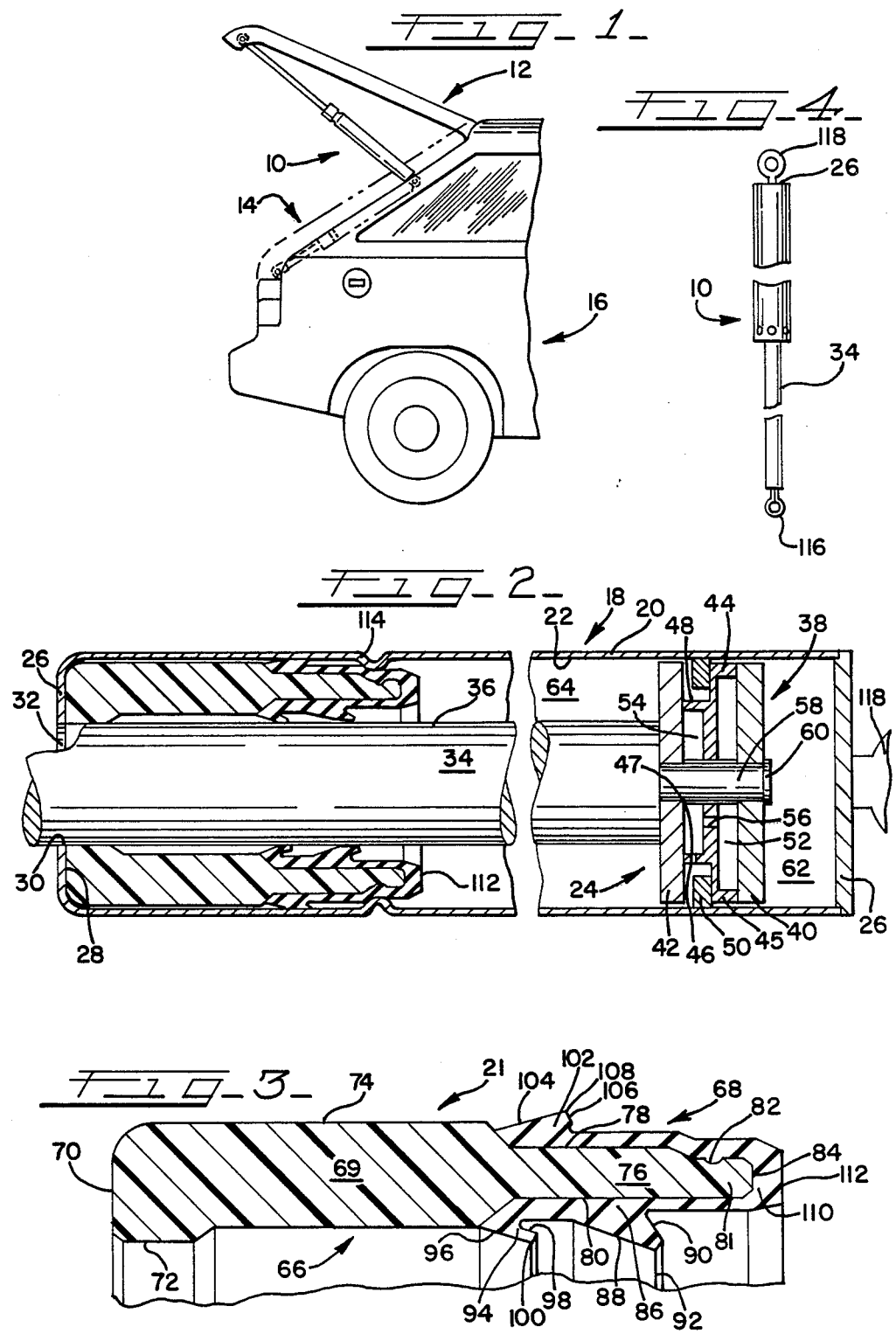

UNITARY SEAL FOR GAS PRESSURE SPRING ASSEMBLY

BACKGROUND AND SUMMARY OF THE INVENTION

The present invention relates generally to fluid seals, and more particularly, to a specialized seal assembly for retaining a fluid such as a compressed gas within the tubular housing portion of a so-called gas spring, that is, a cylinder unit having a reciprocable piston and operating rod assembly disposed therein and biased by a pressurized gas or the like toward an extended position.

More particularly, the invention relates to a one-piece seal unit having a number of novel features and advantages especially adapting it for use in such application. In another aspect of the invention, the invention relates to the combination of such seal with other elements of a gas spring assembly, and to the method of sealing gas springs of the type just referred to.

Because of the availability of seals which are generally satisfactory for the primary function of sealing gas pressure, certain of the potential advantages of so-called gas springs have been fully utilized. These include the provision of an assembly which may endure substantial preloads for a significant time without loss of spring effectiveness, low cost, relative safety in use, ready replaceability, and compatibility with existing technology.

More importantly, so-called gas springs may be made to include other advantageous features, a principal one of which is the ability, without the use of a large number of parts, to provide both spring and damping actions without adding parts.

Still further, gas spring units have the advantage of being able to receive varying amounts of internal pressure and hence, provide varying spring forces without change of mechanical parts or redesign. In this connection, for example, if a gas spring of a particular size is to exert a force sufficient to offset a ten pound load, the same gas spring may be used to support a load which is twice as large by increasing the internal pressure of the unit to substantially twice the pressure required to support the ten pound load.

Accordingly, provided other structural aspects of the gas springs are adequate to the task under consideration a number of load-bearing applications, or pre-load applying forces, may be satisfied by merely varying the amount of pressure or the charge level within the same spring unit.

Because of their simplicity, complete gas spring units may be manufactured and sold at relatively low cost. However, in spite of their known advantages, gas pressure spring units of the prior art have been capable of improvement in the seal area. In this connection, a practice in the prior art was to provide a multi-piece seal which required labor for assembly, and which was not as reliable as might be desired in operation.

Typically, prior art seals were made from perhaps three elements, and in some cases, as many as five separate elements In the five-piece seal, one element was a so called nosepiece which was used in forming the curl serving in use to partially close off the otherwise open end of the tube. Other elements included a felt wiper unit used as a dust wiper or dirt excluder, a separate part used to position the dust or dirt wiper in use, and a composite packing or seal unit used in actually providing the gas-tight seal. This was customarily itself a two-element part with a stiff backing ring and a seal element of V-shape in radial cross-section. These element seals included a nosepiece, a seal and a positioning ring.

Seal assemblies used in prior art gas springs also included a still further separate element in the form of a protecting ring which lay on the high pressure side of the seal assembly and which protected the seal itself and also contained a groove or like means for receiving a locking or crimping bead to prevent axial movement of the seal assembly as a whole.

In the prior art, it was found necessary to assemble the foregoing parts by hand, and then position them one-by-one within the open end of the tube, retaining them in this position during the changing step, and finally curling the ends, after which the unit as a whole would be tested.

Another characteristic of prior art assembled seals was that the seal retainer or protector unit lying on the axially innermost portion of the assembly also served as the "snubber" or movement limiting portion of the seal. This part of the seal, in other words, engaged the lower surface of the piston when the rod was fully extended. Hence, forces tending to urge the piston even further axially outwardly were resisted only by the strength of the crimp or other lock holding this protector unit against axial movement.

In the present invention, the seal is an integral unit and the forces acting on the piston may be transmitted directly from the axially inner or "snubber" end of the seal assembly to the end curl or the like on the opposite axial end of the housing. The seal of the present invention is retained against axial movement in the other direction by a bead, groove, or series of spaced apart dimples which need provide only small forces as necessary for this limited purpose.

In view of the prior art, there existed a need for an improved seal unit which would provide the advantages of the foregoing seals with lower cost and reduced complexity, and which would provide additional advantages as well.

Accordingly, it is an object of the present invention to provide an improved, one-piece seal assembly for a gas spring unit.

Another object is to provide a gas spring assembly having an improved seal forming a part thereof, and cooperating with a piston and rod assembly to seal gas pressure within the housing portion of the assembly.

A further object of the invention is to provide combination gas retention and rod wiper seal in a single unit, which seal may include the functions of providing a guide for the rod, and for providing a series of combination seal lips and check valves for facilitating charging of the gas pressure seal unit after assembly.

Another object of the invention is to provide a seal which includes a positioning body having an end portion which is base or optionally covered with elastomer so as to provide a snubber surface for engagement by the piston portion of the spring assembly to limit axial movement of the rod an piston and to transmit this force directly through the seal to the axially outer end thereof.

A still further object of the invention is to provide a seal wherein positioning may be achieved by an end curl and only a few dimples or a shallow-depth seal locating groove found in the housing portion of the unit.

Another object of the invention is to provide a novel seal assembly for this application, which seal assembly includes an integrally formed rigid one-piece positioning body associated in use with an elastomeric, multi-lip seal body.

Yet another object of the invention is to provide a seal assembly which includes a positioning body having an enlarged thickness portion having guide surfaces adjacent the inner diameter of one end thereof, and which includes a reduced thickness collar or the like serving as locating surfaces for the elastomeric seal body.

Another object of the invention is to provide a seal assembly which includes an elastomeric seal body providing not only a portion adapted to receive a dimples or other formations for locating the seal, but which also provides both a primary and a secondary or static lip seal, and which may additionally provide one or more auxiliary or excluder seal lips.

A further object of the invention is to provide a seal for a gas spring application wherein a primary seal lip and an excluder lip are both provided for engagement with the outer diameter surface of a reciprocable rod forming a part of the seal assembly and wherein both the seal lips act as check valves as well as pressure seals for a gas which is used to pressurize the spring unit after assembly.

A yet further object of the invention is to provide a spring which will provide the same or improved functions relative to prior art seals and which does so at reduced cost.

A still further object of the invention is to provide a seal which incorporates materials particularly suited to a gas spring application and which simplifies installation and handling of the seal.

Yet another object is to provide a seal design wherein the seal lip body may, but need not be, bonded to the positioning body.

The foregoing and other objects and advantages of the invention are achieved in practice by providing a one-piece multi-purpose seal unit which includes a positioning body and an elastomeric seal body, and wherein the seal body is affixed to a collar or reduced thickness portion of the positioning body so as to provide a radially outwardly static seal, at least one radially inwardly directed primary seal for engagement with the rod surface, and which further includes a snubber surface on one end portion for limiting piston travel, with one or more of the primary sealing lips being constructed and arranged so as to act as check valves to permit gas pressure to be added from the exterior of the unit to the interior thereof, and thereafter retaining such gas within the interior of the spring seal unit.

The manner in which the foregoing and other objects and advantages of the invention, including its inherent objects and advantages, are achieved practice will become more clearly apparent when reference is made to the accompanying detailed description of the preferred embodiment of the invention set forth by way of example, and shown in the accompanying drawings, wherein like reference numbers indicate corresponding parts throughout.

BRIEF DESCRIPTION OF THE DRAWINGS

FIG. 1 is a fragmentary side elevational view, partly diagrammatic in nature, showing an application of the gas spring unit which embodies the novel seal of the invention;

FIG. 2 is a greatly enlarged vertical sectional view, with portions broken away, showing the novel seal unit in position of use within the gas spring assembly;

FIG. 3 is a further enlarged fragmentary vertical sectional view of a portion of the seal assembly of the invention, showing it in its relaxed or as-manufactured condition; and FIG. 4 is an elevational view of the gas pressure spring assembly of FIG. 1, taken on an enlarged scale relative to FIG. 1 and showing parts of the gas spring with portions broken away.

DESCRIPTION OF THE PREFERRED EMBODIMENTS OF THE INVENTION

While it will be understood that the principles of the invention are applicable to other mechanisms, that the seal may be employed in other applications, and that different materials may be used in making the seals, a detailed description of a preferred form of seal will be given wherein the sealed mechanism is a gas spring assembly, wherein the seal body is made from a relatively rigid thermoplastic material and wherein the elastomeric seal portion is made from a specialty rubber such as a thermoplastic rubber or from a more conventional material.

Referring now to the drawings in greater detail, FIG. 1 shows a gas spring assembly, generally designated 10, embodying the invention and being used to position a lift back portion, generally designated 12, of the rear deck assembly 14 of an automobile or the like generally designated 16. As will be noted, as the lift back 12 moves between open and closed positions by swinging through an arc, the gas spring assembly 10 moves through a range of positions from a relatively extended to a relatively retracted position.

As will be further understood, the gas spring assembly 10 acts not only to exert an upward force on the lift back 12, that is, the spring assembly is inherently biased to an open position, but for reasons which will appear, this is achieved in the presence of an inherent damping force, whereby the velocity of parts movement is significantly damped for control and safety purposes.

In the form shown in FIG. 2, the gas spring assembly 10 is made from several principal elements, one of which is a housing generally designated 18 in the form of a generally cylindrical tube 20 positioning a seal generally designated 21 at one of its ends. The tube 20 has an inner cylindrical surface 22 in which another major element is positioned, namely a reciprocable piston and operating rod assembly 24. One end of this tube 20 is closed off by welding or otherwise affixing an end cap 26 in gas-tight relation, while the other end of the tube 20 is formed by a radial flange 26 providing an inner end face 28 terminating in a generally circular inner edge 30 providing a rod opening generally designated 32.

As shown, the operating rod and piston assembly 24 includes an operating rod 34 having a smooth outer diameter surface 36 which reciprocates through the opening 32 defined by the inner edge portion 30. Rod movement is occasioned by movement of the piston assembly 38. This assembly in turn includes axially inner and outer crowns 40, 42 spaced apart by a gas transfer ring 44.

A reduced diameter shoulder 46 of the transfer ring 44 partially defines a groove 48 for receiving and positioning a piston sealing ring 50. A countersunk or dished recess or pocket 52 lies on one side of the transfer ring 44 and a counterpart recess or pocket 54 lies on the other side of the ring 44. One or more small axial transfer passages 56 are formed in the center section 55 of the transfer ring to permit limited gas flow between the pockets or recesses 52, 54 in the use of the device. Flow into the pockets is provided by axial spaces between the piston crowns 40, 42 and the transfer ring 44, or by radial ports 47 or other passages serving as a labyrinth (not shown in greater detail) to permit gas flow to and from the pockets 52, 54 on either side of the ring 44.

As is also shown in FIG. 2, a piston crown mounting stud 58 is provided and includes an enlarged head portion 60 for retaining the piston crowns 40, 42 and the transfer ring 44 in an assembled position which is fixed in relation to the end of the rod 34.

In use, resistance to piston movement is created as gas attempts to move from the headspace 62 between the crown 40 and the end plate 26 through the small orifice or transfer passage 56 and into the other sealed chamber 64 of the gas spring assembly 10.

Referring now to the seal assembly per se, this unit is generally designated 21 and is shown to include two principal portions, a rigid positioning body portion generally designated 66 and an elastomeric seal body generally designated 68. The positioning body 66 includes a main, enlarged thickness or principal annular body portion 69 having an axially outer end face surface 70, and a cylindrical inside diameter guide surface 72 adapted to be spaced in use by a slight working clearance from the outer diameter surface 36 of the rod 34.

The principal body portion 69 also includes a cylindrical outside diameter alignment surface 74 adapted to be snugly received within or closely spaced apart from the inner diameter surface 22 of the tube 18. In the preferred form illustrated, the positioning body 66 also includes an axially inner collar unit 76 of reduced thickness so as to provide a reduced outside diameter bonding surface 78 and an enlarged inside diameter bonding surface 80. The axially innermost portion of the collar 76 is a contoured annular nose portion 81 providing a locating groove 82 near the snubber end face 84. The positioning body 66 is preferably made from a filled or unfilled, rigid thermoplastic material providing low cost and accurate moldability.

The other major component of the seal 21 is the elastomeric body unit generally designated 68 and shown to include a primary seal lip body 86 defined by converging beveled or frustoconical surfaces 88, 90. A substantially circular primary seal band 92 is formed at or near the convergence of these surfaces. By "primary" seal band is meant a seal band which engages a relatively movable part and whose primary function is to retain fluid (in this case, gas) within the sealed region.

In the preferred form of seal unit 21, the elastomeric seal body 68 also includes a so-called excluder or auxiliary lip body 94 defined in part by frustoconical surfaces 96, 98 both of which taper axially and radially inwardly as well as towards each other A substantially circular auxiliary or excluder lip seal band 100 is formed by the convergence of these or other adjacent lip-defining surfaces. Both the lip bodies 86, 94, in the preferred forms shown, extend axially and radially inwardly, and because of their configuration, act in use as check valves, i.e., they readily permit passage of fluid from a higher pressure region to a lower pressure region, or from the outside to the inside of the sealed region (to the right in FIG. 3). However, the seal strongly resists movement of fluid from the sealed region to the exterior (to the left in FIG. 3) of the spring unit 10.

A static lip body 102 defined by convergent frustoconical surfaces 104, 106, is formed on the outer surface of the elastomeric seal body 68. A circular seal band 108 is also formed at the convergence of these surfaces. By "secondary seal" is meant a static seal or seal between parts which are fixed relative to each other in use.

Referring again to FIG. 3 it is shown that an end face surface 84 of the nose 81 is covered with a annular bead 110 of rubber, and that this bead 110 in turn presents an end face surface 112 which acts as a combination movement limiting and snubber surface for the seal unit. Thus, when an underside of the piston crown 42 contacts this surface, there will be no further piston movement. The construction of the snubber as a part of the body permits the piston-stopping forces to be transmitted through the relatively rigid unitary locating body 66 to the outer end face 70 which engages the end face 28 of the curl 26 on the housing tube 20. In the prior art, this force was resisted only by a locating groove.

Referring now to FIG. 2, it will be noted that one or more dimples 114 may be formed in the exterior of the tube 20 in such a manner as to cooperate with the groove 82 in the nose 81 of the unit 66. These dimples depress a portion of the elastomeric body which itself provides moderate resistance to deformations, but which, in cooperation with the relatively stiff collar, affords cooperating means locking the seal against axial displacement, especially displacement inwardly of the unit or to the right as in FIGS. 2 or 3.

The locking action may be provided by dimples 114 or a locking groove which, in effect, is a series of continuous dimples. In some instances, it may be desired to position the seal and then form the groove or set of spaced apart dimples before the curl 26 on the end of the unit is formed. In this case, the arrangement provides sufficient locating action to prevent movement of the seal assembly in either direction.

Referring now to the manufacture of the seal assembly of the invention, the rigid body 66 is preferably made by injection molding or otherwise forming the body 66 from a thermoplastic material Thereafter, this is used as in insert in a press having a cavity whose surfaces define the shape of the elastomeric seal body 68. Injection, compression, or transfer molding techniques may be used to simultaneously form the elastomeric seal body 68 and bond it to the positioning body 66. In the alternative, the seal body 68 may be separately formed and fitted over the positioning body 66, with or without adhesives. If the eleastomeric seal body is formed such that it is not U-shaped in radical cross-sections, adhesive or bonded attachment will be necessary.

Rubbers curing at low temperature or thermoplastic rubbers may be used for this application, and are advantageous where a thermoplastic material is used in the formation of the positioning unit 66. Of course, in the alternative, the positioning unit can be made from metal, thermosetting resins or other suitable materials, and while advantageously formed from a single piece, this unit 66 could conceivably be made from two or more pieces. In some cases, formation by powder metal techniques may be advantageous.

The elastomer may be a conventional thermosetting elastomer such as nitrile or like rubbers, or may be silicone or urethane elastomers, if this is desired for some reason. However, because of the low cost and because the products are not normally used in high temperature environments, an economical rubber such as a thermoplastic elastomer is preferred for many applications.

Referring now to other, more general aspects of the invention, it is shown in FIG. 4 that the rod 34 and the end cap 26 may both include closed end or eye portions 116, 118 for securing ends of the assembly to associated parts in use. Knobs (not shown) or other formations may be provided, or the tube may be positioned by other means.

In operation, when the assembly 10 is charged with gas under relatively high pressure, the spring unit will be biased to an extended position of the rod 34. This is because, while the pressure within the fluid is the same, and low rate transfer of fluid is constantly permitted by reason of the gas transfer ring passage 56, gas pressure acts over the entire axially inner surface of the crown 40 while ga pressure acting from within the other chamber 64 is exerted only on those surface portions of the outer crown 42 which are directly exposed to the fluid, that is only to the surfaces not occupied by the rod Hence, the net force urging the rod outward is equal to the product of the internal pressure and the cross-sectional area of the rod.

Referring now to other matters, one important feature of the invention is that the excluder lip bodies 86, 94 are formed as described, i.e., that each includes lip body-defining surfaces which taper axially and radially inwardly so as to provide the check valve action referred to above. Another important feature of the present invention is the making of the seal as a single piece, or at least making it from two elements which may be assembled to form a single assembly prior to manufacture.

While the seal of the present invention is incorporated into the gas spring assembly in a manner similar to that in the prior art, the assembly of the seal in place by positioning individual elements over the rod is no longer necessary. Thus, the customary way of assembling the gas spring is to select a suitable length of tubing and close off one of its ends with a cap such as the cap 26 or the like described herein. Thereafter, the piston and operating rod sub-assembly is assembled from the various components described in this unit is inserted into the open end of the tube. The sealed unit 21 of the invention is placed over the opposite end of the rod and the seal is inserted to the desired depth within the tube opening. Thereupon, the dimples or a locating groove such as the groove 114 is rolled or otherwise formed into the tubing forming the outer housing to locate the seal assembly. Thereafter, the assembly is placed on a suitable machine and the interior of the gas spring unit is pressurized to a desired level, such as 50 to 150 PSI or more With the unit thus pressurized, suitable dies are positioned and manipulated so as to impart an end curl 26 into what was formerly the open end of the tube, thus locking the seal unit 21 in place. Charging of the unit during the above-described step involves passage of the gas from the open end portion of the seal beneath the sealing lips along the outside diameter of the operating rod and into the lower cavity 64 as well as the head space 62. After the high pressure gas source is removed, the charge will remain within the interior of the tube where it is held by the check valve action of the seal unit.

Tests have indicated a satisfactory to very satisfactory seal life for seals made according to the invention; specifications for products such as these require them to operate through several thousand up to several hundred thousand or more service cycles without loss of more than a small fraction of their original spring force. Thus, by far the major portion of the original charge of gas may remain sealed in the unit for several years or more.

While a form of seal has been shown wherein the cylindrical surface 72 lies near one end of the positioning body 66 for engaging the outside diameter 36 of the rod 34, one or more such guide or bearing surfaces may be provided, including surfaces lying closely adjacent the primary or auxillary lips. Single or plural such guide surfaces may be provided as desired. Likewise, the preferred form of seal unit 21 has been shown wherein there is one secondary seal lip and, one primary seal lip and one auxillary or excluder seal lip. It is within the ambit of the invention to provide two or more primary or auxillary seal lips as well as two or more secondary lips, in any appropriate combination.

As pointed out, it is an advantage of the invention that, where the elastomeric body 68 is of U-shaped configuration in radial cross-section, it may be fitted over the reduced diameter portion of the seal positioning body 66 and need not necessarily be bonded to the body 66 in order to provide leak-free performance. However, in many cases a post-form bond of adhesive or the like may be provided as may a bond formed during the molding process.

It will thus be seen that the present invention provides an improved gas spring and a novel seal therefor, said spring and seal having a number of advantages and characteristics including those pointed out herein and others which are inherent in the invention A preferred embodiment of the invention having been described by way of example, it is anticipated that variations and modifications to the described form of seal and spring may occur to those skilled in the art and that such modifications and changes may be made without departing from the spirit of the invention or the scope of the appended claims.

I claim:

1. A one-piece multi-purpose seal assembly for a gas-pressurized spring assembly which includes a tubular housing and a reciprocable piston and operating rod assembly received for reciprocable movement within said housing, said seal assembly being adapted to retain gas pressure within the interior of said housing, said housing including a first, closed end portion, a cylindrical sidewall portion and an open end portion for permitting movement therethrough of said operating rod, said seal assembly including a rigid seal positioning unit and an elastomeric seal body integrally bonded thereto, said seal positioning unit having a first body portion of generally annular form and having a cylindrical outer diameter alignment surface and an inner diameter cylindrical guide surface adjacent the axially outer end thereof, said guide surface being adapted to be spaced apart in use from the outer diameter surface of said operating rod by a working clearance, and a second, reduced thickness body portion extending axially inwardly from said first body portion, said second body portion having generally cylindrical, radially inner and outer bonding surfaces joined at their axially inner ends by an end surface portion serving as a snubber for limiting the axial movement of said piston, said elastomeric seal body including radially inner and outer seal portions, said radially outer portion overlying said outer bonding surface of said seal positioning unit, with said radially outer portion having a spaced apart bevelled surfaces tapering toward each other and defining therebetween an annular, radially outwardly acting static sealing lip body which includes a substantially circular, static seal band forming its outer diameter, said radially inner portion covering said inner bonding surface of said positioning unit and having at least one pair of spaced apart bevelled surfaces tapering towards each other to define therebetween a primary lip body which includes a substantially circular inner diameter primary seal band, and means on at least one portion of said positioning unit for cooperatively engaging a portion of said housing for locking said seal unit against axial movement relative to said housing.

2. A seal assembly as defined in claim 1 in which said radially inner portion of said elastomeric seal body further includes spaced apart, bevelled surfaces tapering toward each other to define therebetween an annular, radially inwardly acting auxiliary sealing lip body having a substantially circular auxiliary seal band forming its inner diameter.

3. A seal assembly as defined in claim 2 wherein said bevelled surfaces defining said primary lip body and said bevelled surfaces defining said auxiliary lip body are all inclined radially and axially inwardly with respect to said positioning unit, whereby both said primary and said auxiliary lip bodies act as check valves.

4. A seal assembly as defined in claim 1 wherein said pair of bevelled surfaces defining said primary lip body are both inclined axially and radially inwardly of said positioning unit, whereby said primary lip body also acts as a check valve.

5. A seal assembly as defined in claim 1 wherein said means on said portion of said seal positioning unit for cooperatively engaging said portion of said housing comprises a radially outwardly directed groove in a portion of said reduced thickness body portion of said positioning unit, said groove being covered by a portion of said elastomeric seal body.

6. A seal assembly as defined in claim 1 wherein said snubber end surface portion of said reduced thickness body portion comprises an end face surface having a covering of elastomeric material bonded thereover.

7. An improved gas-pressurized spring assembly having a cylindrical housing, means closing off one end of said housing, a piston and operating rod assembly positioned within said housing for reciprocable movement, and a seal assembly cooperating with a portion of said rod to close off the other end of said housing and adapted to retain gas pressure within the interior of said housing, said seal assembly including a rigid seal positioning unit and an elastomeric seal body integrally bonded thereto, said seal positioning unit having a first body portion of generally annular form and having a cylindrical outer diameter alignment surface and an inner diameter cylindrical guide surface adjacent the axially outer end thereof, said guide surface being spaced apart in use from the outer diameter surface of said operating rod by a working clearance, and a second reduced thickness body portion extending axially inwardly from said first body portion, said second body portion having generally cylindrical, radially inner and outer bonding surfaces joined at their axially inner ends by an end surface portion, serving as a snubber for limiting the axial movement of said piston, said elastomeric seal body including radially inner and outer portions, said radially outer portion overlying said outer bonding surface of said seal positioning unit, with said radially portion having spaced apart bevelled surfaces tapering toward each other and defining therebetween an annular, radially outwardly acting static sealing lip body which includes a substantially circular, static seal band forming its outer diameter, said radially inner portion covering said inner bonding surface of said positioning unit and having at least one pair of spaced apart bevelled surfaces tapering towards each other and defining therebetween a primary lip body which includes a substantially circular inner diameter primary seal band, and cooperating locking means on at least one portion of said positioning unit and a portion of said housing to lock said seal unit against axial movement relative to said housing.

8. A gas spring assembly as defined in claim 7 in which further includes spaced apart, bevelled surfaces tapering toward each other to define therebetween an annular, radially inwardly acting auxiliary sealing lip body having a substantially circular auxiliary seal band forming its inner diameter.

9. A gas spring assembly as defined in claim 8 wherein said bevelled surfaces defining said primary lip body and said bevelled surfaces defining said auxiliary lip body are all inclined radially and axially inwardly with respect to said positioning unit, whereby both said primary and said auxiliary lip bodies act as check valves.

10. A gas spring assembly as defined in claim 7 wherein said pair of bevelled surfaces defining said primary lip body are both inclined axially and radially inwardly of said positioning unit, whereby said primary lip body also acts as a check valve.

* * * * *